(12) United States Patent
Naffziger (10) Patent No.: US 6,892,294 B1
(45) Date of Patent: May 10, 2005

(54) IDENTIFYING EXECUTION READY INSTRUCTIONS AND ALLOCATING PORTS ASSOCIATED WITH EXECUTION RESOURCES IN AN OUT-OF-ORDER PROCESSOR

(75) Inventor: Samuel D Naffziger, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/497,533

(22) Filed: Feb. 3, 2000

(51) Int. Cl.$^7$ ................................................ G06F 9/30
(52) U.S. Cl. ...................................... 712/215; 712/216
(58) Field of Search ............................... 712/215, 216, 712/217

(56) References Cited

U.S. PATENT DOCUMENTS

| | | | | |
|---|---|---|---|---|
| 5,748,934 A | | 5/1998 | Lesartre et al. ............. | 395/392 |
| 5,758,178 A | * | 5/1998 | Lesartre ...................... | 711/141 |
| 5,761,474 A | | 6/1998 | Lesartre et al. ............. | 395/393 |
| 5,761,713 A | | 6/1998 | Lesartre ...................... | 711/127 |
| 5,796,975 A | | 8/1998 | Lesartre et al. ............. | 395/394 |
| 5,796,997 A | | 8/1998 | Lesartre et al. ............. | 395/581 |
| 5,799,167 A | | 8/1998 | Lesartre ...................... | 395/394 |
| 5,809,275 A | | 9/1998 | Lesartre ...................... | 395/392 |
| 5,838,942 A | | 11/1998 | Lesartre ...................... | 395/394 |
| 5,875,340 A | | 2/1999 | Quarnstrom et al. ........ | 395/733 |
| 6,289,437 B1 | * | 9/2001 | Eisen et al. .................. | 712/217 |
| 6,308,260 B1 | * | 10/2001 | Le et al. ...................... | 712/215 |

OTHER PUBLICATIONS

Microsoft Computer Dictionary, 1999, Microsoft Press, Fourth Edition, p. 32.*

* cited by examiner

*Primary Examiner*—Eddie Chan
*Assistant Examiner*—Charles Harkness (57) ABSTRACT

A find-instructions-and-allocate-ports (FIAP) circuit and method are provided for quickly and efficiently locating one or more instructions that are ready for execution during a launch cycle in an out of order processor and allocating one or more ports associated with one or more execution resources to such ready instructions during the launch cycle. In architecture, the processor includes an instruction reordering mechanism, for example, a queue, having a plurality of slots for temporarily storing a plurality of respective instructions. Instructions can be executed in an out of order sequence from the queue. Each slot is provided with the FIAP circuit for causing and preventing launching, when appropriate, of their respective instruction. A plurality of signals is propagated successively through the FIAP circuits of the queue that causes the queue to launch a predefined plurality of the instructions, which corresponds to a predefined plurality of ports associated with the one or more execution resources. As propagation of the set of signals occurs through each slot, the set of signals indicates to the slot when and which of the one or more ports are available for each said instruction and when none of the ports are available.

23 Claims, 5 Drawing Sheets

FIG. 2

| INSTR SLOT | STAT | N00 | N01 | N02 | N03 | L | LAUNCH OR NOT? |
|---|---|---|---|---|---|---|---|
| 7 | R | 0 | 0 | 0 | 0 | 1 | NO |
| 6 | R | 0 | 0 | 0 | 0 | 1 | YES, TO P3 |
| 5 | R | 0 | 0 | 0 | 1 | 0 | YES, TO P2 |
| 4 | NR | 0 | 0 | 1 | 0 | 0 | NO |
| 3 | R | 0 | 0 | 1 | 0 | 0 | YES, TO P1 |
| 2 | NR | 0 | 1 | 0 | 0 | 0 | NO |
| 1 | R | 0 | 1 | 0 | 0 | 0 | YES, TO P0 |
| 0 | NR | 1 | 0 | 0 | 0 | 0 | NO |

FIG. 4

IDENTIFYING EXECUTION READY INSTRUCTIONS AND ALLOCATING PORTS ASSOCIATED WITH EXECUTION RESOURCES IN AN OUT-OF-ORDER PROCESSOR

FIELD OF THE INVENTION

The present invention generally relates to, computer processors that execute instructions out of order, and more particularly, to a new circuit and method for quickly and efficiently locating one or more instructions that are ready for execution during a launch cycle in an out of order processor and allocating one or more ports associated with one or more execution resources to such ready instructions during the launch cycle.

BACKGROUND OF THE INVENTION

A computer processor (processing unit), such as an integrated circuit (IC) based microprocessor, generally comprises a control unit, which directs the operation of the system, and one or more execution units, for example, arithmetic logic units (ALUs), which perform computational operations. The design of a processor involves the selection of a register set(s), communication passages between these registers, and a means of directing and controlling how these operate. Normally, a processor is directed by a program, which includes of a series of instructions that are kept in a main memory. Each instruction is a group of bits, usually one or more words in length, specifying an operation to be carried out by the processor. In general, the basic cycle of a processor comprises the following steps: (a) fetch an instruction from memory into an instruction register; (b) decode the instruction (i.e., determine what it indicates should be done; each instruction indicates an operation to be performed and the data to which the operation should be applied); (c) carry out the operation specified by the instruction; and (d) determine where the next instruction is located. Normally, the next instruction is the one immediately following the current one.

However, in high performance processors, such as superscalar processors where two or more scalar operations are performed in parallel, the processors may be designed to perform instructions out of order, or in an order that is not consistent with that defined by the software driving the microprocessor. In these processors, instructions are executed when they can be executed, as opposed to when they appear in the sequence defined by the program. Moreover, after execution of out of order instructions, the results are ultimately reordered to correspond with the instruction order, prior to passing the results back to the program.

Out of order execution of instructions poses peculiar obstacles from a design perspective. One such obstacle involves quickly locating instructions that are ready to be executed and permitting such ready instructions to access execution resources, as appropriate.

More specifically, in some implementations of out of order processors, instructions are fetched and then placed in respective slots of a queue (i.e., a temporary storage means), where the instructions are launched, or executed, in an out of order sequence. Each slot has a memory that is capable of temporarily storing information about an instruction and has some local logic functionality to support the memory. Typically, some type of control logic associated with the queue determines which and when instructions will be launched from the queue during a launch cycle. When each instruction is executed, this control logic causes the instruction to communicate with one or more execution resources, for example, ALUs or memory ports, and during each launch cycle, this control logic may cause more than one instruction to launch into execution, depending upon the nature and extent of the execution resources. In some present day designs of microprocessors, up to four instructions are launched during each launch cycle.

In determining which instructions should be launched during a launch cycle, the control logic evaluates a number of criteria, including for example, the age of an instruction in the queue (i.e., generally older instructions should be executed before newer instructions wherever possible), instruction dependencies, etc. An instruction, called a "dependent" instruction, is dependent upon another instruction, called a "producer" instruction, when the dependent instruction operates upon an operand or result that is produced from the producer instruction. Generally, dependent instructions are placed after their producer instructions in program order, and therefore, in a typical processor that executes instructions in order, the dependent instructions are executed after their producer instructions. However, in a processor that executes instructions out of order, unless safeguards are implemented, it is possible that a dependent instruction may be executed prior to the producer instruction from which it depends. Thus, the control logic will not permit an instruction to execute if it is dependent upon another producer instruction and the other producer instruction has not yet executed.

Another type of conflict present in many memory systems, such as on-chip SRAM (static random access memory) cache, involves contention for memory banks. Often, memory is organized into two or more banks, each of which can be accessed independently, but each can supply only one word of data during a launch cycle. U.S. Pat. No. 5,761,713 to Lesartre describes an example of such a cache. If two or more accesses are presented to the memory, then they can both execute if their addresses are for different banks. If more than one access addresses the same bank of memory, all but one will need to wait. The control logic can use bank conflicts as another criterion to qualify whether an instruction is ready to launch.

When an instruction is ready to be executed (has no operand dependencies and no cache conflicts, among other things), a local launch logic element associated with to each slot (as well as each instruction) indicates this ready condition. During a cycle, a part of the control logic of the queue, sometimes referred to as arbitration logic, seeks out ready instructions by analyzing the information from the launch logic elements associated with the slots and instructions, allocates one or more ports to the ready instructions, and causes the ready instructions to launch into execution. Historically, this arbitration part of the control logic associated with the queue has been complex, slow, and takes up space, which are very undesirable in the context of an integrated circuit (IC) microprocessor. An example of the foregoing logic, in the context of a memory queue, is set forth in U.S. Pat. No. 5,761,713 to Lesartre (see arbitration logic of FIGS. 5A–5D), which is incorporated herein by reference. The logic described in the aforementioned patent is hierarchical, in a sense, and requires much combinational logic. Thus, there is a need in the art for a better form of control logic for locating instructions that are ready to be executed during a launch cycle and permitting such ready instructions to access execution resources, as appropriate.

SUMMARY OF THE INVENTION

The present invention provides a find-instructions-and-allocate-ports (FIAP) circuit and method for quickly and efficiently locating one or more instructions that are ready for execution during a launch cycle in an out of order processor and allocating one or more ports associated with one or more execution resources to such ready instructions during the launch cycle.

Briefly described, in architecture, the processor includes an instruction reordering mechanism, for example but not limited to, a queue, for temporarily storing a plurality of respective instructions. The queue has a plurality of slots for temporarily storing the plurality of instructions, respectively. Instructions can be executed in an out of order sequence from the queue. Each slot is provided with the FIAP circuit for causing and preventing launching, when appropriate, of their respective instruction. A plurality of signals are propagated successively through the FIAP circuits of the queue during a launch cycle that causes the queue to launch a predefined plurality of the instructions during the launch cycle, which corresponds to a predefined plurality of ports associated with one or more execution resources. The execution resources may include, for example but not limited to, an arithmetic logic unit (ALU), a multiple accumulate unit (MAC), a cache memory, or any other resource capable of being accessed or utilized by an instruction. As propagation of the set of signals occurs through each slot, the set of signals indicates to the slot when and which of the one or more ports are available for each said instruction and when none of the ports are presently available (because they have already been allocated to other slots).

The present invention can also be conceptualized as providing a method for finding a predefined plurality of instructions, if available, that are ready to be executed and that reside in a queue of a processor that can launch execution of instructions out of order. In this regard, the method can be broadly summarized by the following steps: (a) providing an instruction reordering mechanism, such as a queue, having a plurality of instructions, each instruction having a respective logic element for causing and preventing launching, when appropriate, of the instruction; and (b) propagating a set of signals successively through the collection of logic elements of the queue during a launch cycle that causes the logic elements to launch the predefined plurality of instructions, while advising the remainder of the predefined plurality that they cannot launch during this launch cycle, as no more ports are available.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
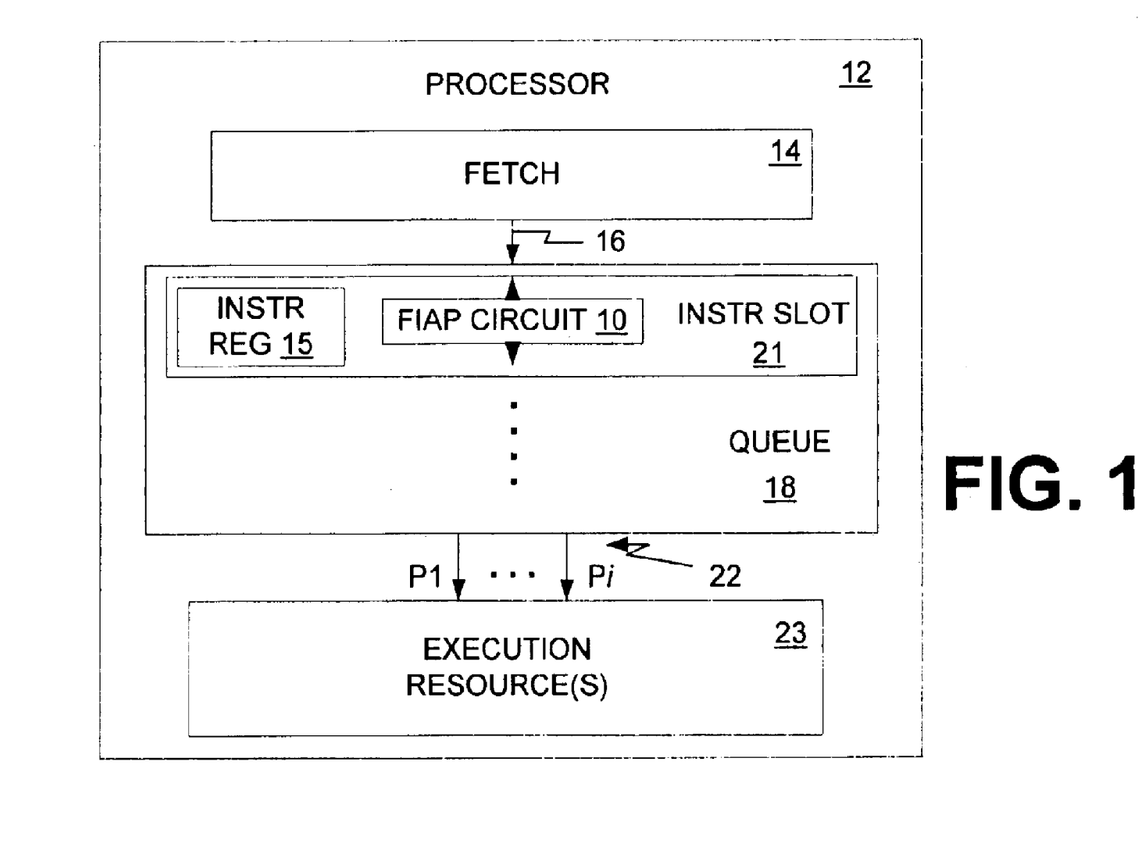
FIG. 1 is a block diagram showing the find-instructions-and-allocate-ports (FIAP) circuit (and method) of the present invention, which is associated with each instruction slot of a queue in a processor.

FIG. 1 shows a high level block diagram of the find-instructions-and-allocate-ports (FIAP) circuit 10 in accordance with the present invention. The FIAP circuit 10 is implemented within a processor 12 that executes instruction out of order, for example but not limited to, an integrated circuit (IC) based microprocessor, which can be utilized in any suitable computer, for example, but not limited to, a personal computer or workstation. An example of a processor architecture for executing instructions out of order is illustrated in FIG. 1 for purposes of illustrating and explaining the FIAP circuit 10.

Architecturally, the out of order processor 12 of this example includes an instruction fetch mechanism 14 that retrieves instructions, typically although not necessarily, from a cache (not shown, for simplicity), for ultimate execution. The fetch mechanism 14 communicates, or "inserts," sets of instructions into an instruction reordering mechanism, for example but not limited to, a queue 18, which generally comprises a temporary storage means from which the instructions are executed, when appropriate. Many designs of the fetch mechanism 14 as well as the queue 18 are well known in the art.

As shown in FIG. 1, the queue 18 comprises a plurality of instruction slots 21, sometimes referred to in the art as "arbitration reorder buffer slots," or just "arbslots." Each instruction slot 21 has a respective register 15 for storing information about a instruction. The instructions in the queue 18 can be executed in an out of order manner. When execution of an instruction is commenced, then the instruction is said to have been "launched." When an instruction is executed, it accesses one or more ports P1 . . . Pi associated with the one or more execution resources 23. Each execution resource 23 can be any suitable execution apparatus, for example but not limited to, an arithmetic logic unit (ALU), a multiply accumulate unit (MAC), cache memory etc. The instruction can cause each execution resource 23 to retrieve and process one or more operands from rename registers (not shown). As an instruction completes operation upon operands, the results are captured by registers. Ultimately, a retire mechanism (not shown, for simplicity) receives already executed instructions from the queue 18 and "retires" the instructions by committing their execution results to the architecture state, or in the case of memory accesses, returns the data to the requesting unit.

As nonlimiting examples, the following U.S. patents describe the aforementioned architecture and functionality, ie., an out of order processor with a queue having instruction slots, from which instructions are inserted, executed, and retired: U.S. Pat. Nos. 5,838,942; 5,796,975; 5,761,713; 5,761,474; and 5,748,934, which are all incorporated herein by reference.

Generally, the set of FIAP circuits 10 of the present invention, collectively working together in combination, are designed to, find i number (where i=1, 2, 3, . . . ) of instructions during each launch cycle that are ready to be executed, to notify launch logic 32 (FIG. 2) associated with each instruction slot 21 to launch during the launch cycle, and to advise each launch logic as to which port(s) P1 . . . Pi, denoted by reference numeral 22, can be accessed by the respective instruction. Significantly, in accordance with the present invention, the FIAP circuits 10 are simple in design and enable a quick and efficient way to identify ready instructions and to allocate port resources. Essentially, the collection of FIAP circuits 10 propagate, or ripple, a set of signals successively through the instruction slots 21 that perform the selection of instructions and allocation of ports P1 . . . Pi during each launch cycle. This propagation scheme is best described with reference to FIG. 2.

Figure 2:
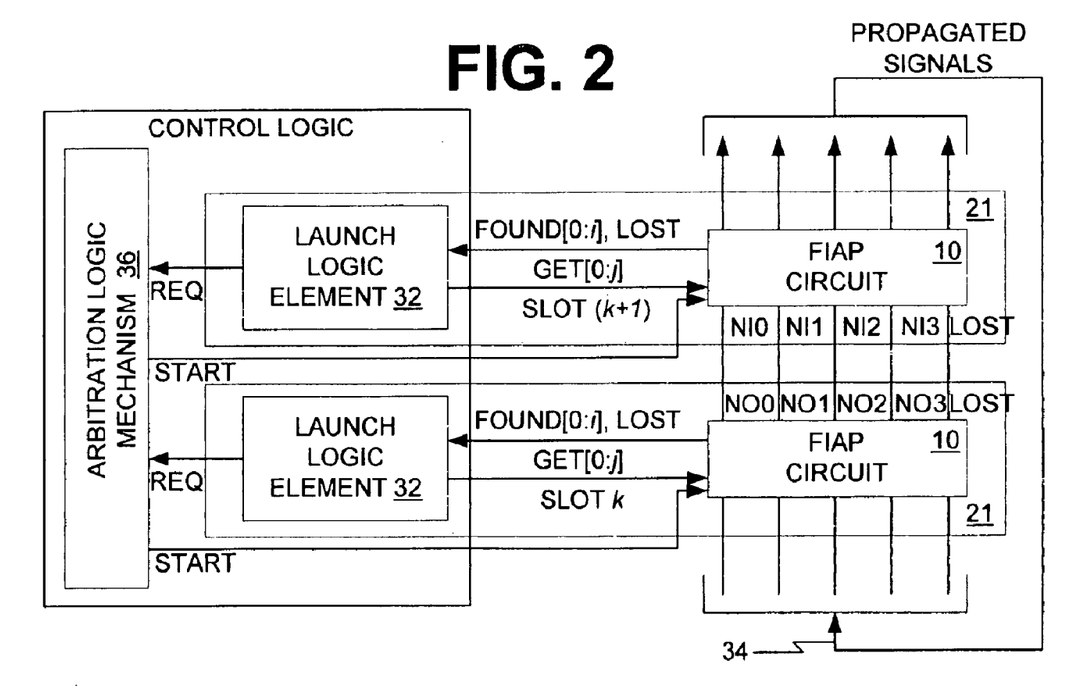
FIG. 2 is a block diagram showing the connectivity and interaction among adjacent FIAP circuits of FIG. 1 and, control logic associated with the queue of FIG. 1.

The interaction of adjacent FIAP circuits 10 is illustrated in FIG. 2. FIG. 2 shows an example of adjacent instruction slots 21 (k and k+1), where k=0, 1, . . . ), which reside in the queue 18 (FIG. 1). As shown in FIG. 2, each slot includes a local launch logic element 32, typically comprised of combinational logic having a network of logic gates, that essentially tracks the status of its associated instruction in the register 15 (FIG. 1) of its respective slot 21. The launch logic element 32 tracks, among other things, operand dependencies and cache access conflicts, if applicable, and determines when its associated instruction is ready to be launched. Each local launch logic element 32 communicates with global arbitration logic mechanism 36.

Among many other logic arrangements that are possible, an example of a launch logic element 32 is described in U.S. Pat. No. 5,761,474 to Lesartre (see the launch control logic 102 and operand dependency logic 104 therein, which in combination could constitute an example of the launch logic element 32 herein), which is incorporated herein by reference. Another nonlimiting example of a launch logic element 32 is described in U.S. Pat. No. 5,748,934 to Lesartre et al. (see the launch control logic 55 and operand dependency logic 53 therein, which in combination could constitute an example of the launch logic element 32 herein), which is incorporated herein by reference. Still another nonlimiting example of a launch logic element 32 is described in U.S. Pat. No. 5,796,975 to Lesartre et al. (see the launch control logic 116 and operand dependency logic 115 therein, which in combination could constitute an example of the launch logic element 32 herein), which is incorporated herein by reference.

The arbitration logic mechanism 36 receives, prioritizes, and grants REQUESTs (REQ), each as appropriate, from the various launch logic elements 32. The arbitration logic mechanism 36 is implemented with any suitable logic, including for example, combinational logic and/or a state machine. In the preferred embodiment, requests are prioritized generally based upon longevity in the queue 18; however, other priority schemes are possible and may be utilized. For each launch cycle, the arbitration logic mechanism 36 passes a START signal (FIGS. 3A and 3B) to one of the FIAP circuits 10 of a particular slot 21, typically the one containing the oldest instruction, which ultimately causes a set of slots 21 to be selected and allocated to ports 22 (FIG. 1), using the propagation scheme and FIAP circuits 10. Arbitration logic is well known in the art. Among many other logic arrangements that are possible, an example of a logic arrangement for the arbitration logic mechanism 36 is described in U.S. Pat. No. 5,761,713 to Lesartre (see odd or even arbitrator 84a, 84b, therein), which is incorporated herein by reference.

Figure 3A:
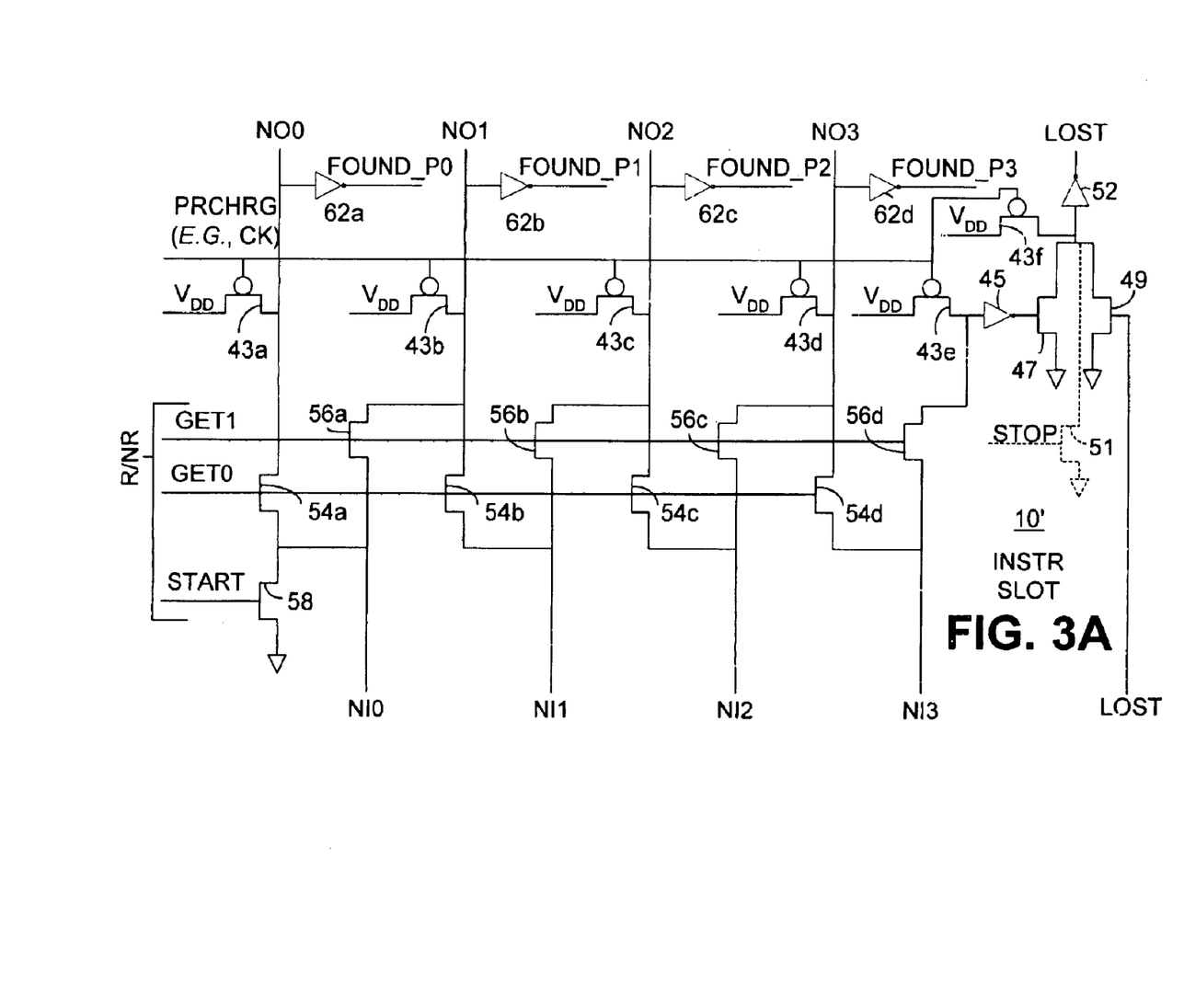
FIG. 3A is a first embodiment of the FIAP circuit for FIG. 1.

When a launch logic element 32 determines that its associated instruction is ready to be launched, based upon, as examples, the clearing of any operand dependencies and perhaps the receipt of an asserted launch signal from the arbitration logic mechanism 36, then the launch logic element 32 asserts one or more GET signals (GET1 in FIG. 3A; GET1 and GET2 in FIG. 3B), as shown in FIG. 2, to its respective FIAP circuit 10 for obtaining access to one or more respective ports P1 . . . Pi (FIG. 1) associated with one more execution resources 23 (FIG. 1). In essence, the FIAP circuits 10, collectively in combination, allocate the ports P1 . . . $P_i$ during each launch cycle to respective ones of the slots 21. As illustrated in FIG. 2, each FIAP circuit 10 receives from a previous FIAP circuit 10 and forwards to a later FIAP circuit 10 a set of signals that are used to track and allocate port availability. In the preferred embodiment, the set 34 of signals are N0 . . . N3 and LOST. In a sense, the set 34 of signals N1 . . . N3, LOST, are propagated successively through the FIAP circuits 10 in a ring-like configuration, starting with the FIAP circuit 10 in the slot 21 that receives the START signal from the arbitration logic mechanism 36. The N0 . . . N3 and LOST signals that are output from one FIAP circuit 10 (NO0 . . . NO3 and LOST) are the inputs to the next adjacent FIAP circuit 10 (NI0 . . . NI3 and LOST). Those slots 21 that will be permitted to launch during a particular launch cycle will have one or more FOUND signals asserted in their respective FIAP circuit 10, while both (a) the not ready slots 21 and (b) those ready slots 21 that will not have access to the ports 22 will be provided with a LOST signal by their respective FIAP circuits 10.

Figure 3B:
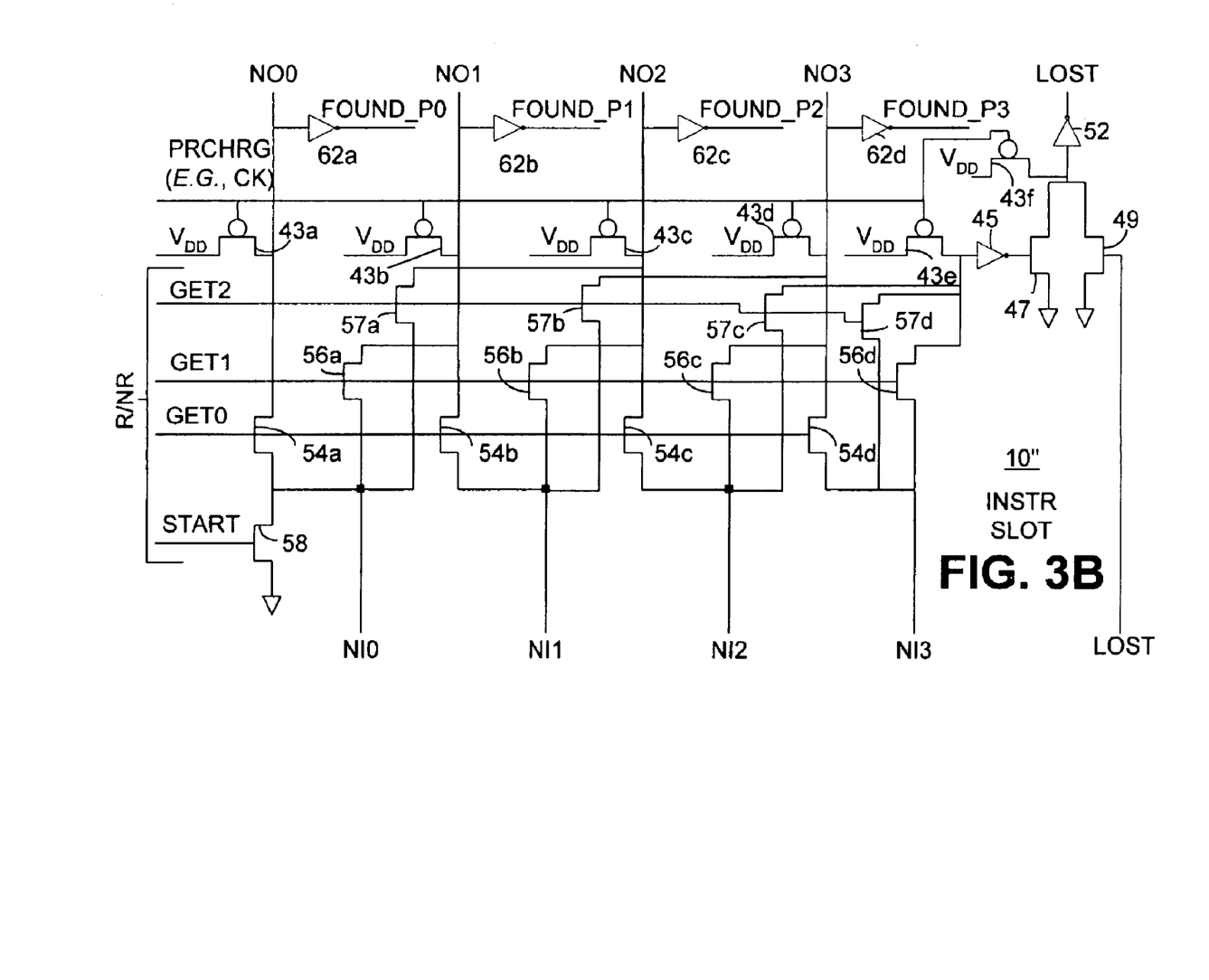
FIG. 3B is a second embodiment of the FIAP circuit of FIG. 1.

FIGS. 3A and 3B show first and second embodiments, respectively, (intended to be nonlimiting specific examples of implementations) of the FIAP circuit 10 (FIGS. 1 and 2) and are generally denoted by reference numerals 10' 10", respectively. The FIAP circuit 10' is capable of allocating access to one port 22 (any one of P1 . . . Pi) associated with an execution resource 23 during each launch cycle, whereas the FIAP circuit 10" of FIG. 3B is a higher performance configuration that is capable of allocating access to up to two ports 22 (any two of P1 . . . Pi) associated with one or more execution resources 23 during each launch cycle. Both configurations can be used depending on the nature of the instructions being queued and the execution resources being arbitrated for.

A precharge connection 42 is designed to provide a precharge signal, for example but not limited to, a clock signal CK, to p-channel metal oxide semiconductor field effect transistors (PMOSFETs) 43a–43f, initially during the launch cycle or at a time prior thereto, in order to drive to high voltage (I.e., at or in close proximity to $V_{DD}$) the output nodes NO0 . . . NO3, while the LOST output node is driven to low voltage by way of inverter 52. The signals NO0 . . . NO3 and LOST as well as NI0 . . . NI3 are all active low (low voltage means logic high, or also "asserted"; high voltage means logic low, or also "deasserted") in these specific first and second embodiments.

As will be more fully described hereafter, the set 34 of signals NO0 . . . NO3 and LOST are propagated from FIAP circuit 10' to FIAP circuit 10', each in a monotonic progression. More specifically, when each FIAP circuit 10' performs a logic evaluation upon its respective inputs NI0 . . . NI3 and LOST, the FIAP circuit 10' makes its logic evaluation, or determination, based upon whether or not any of its inputs transitions from high voltage to low voltage during the time that each evaluates its inputs. The monotonic progression is made possible by the dynamic nature of the precharged PMOSFETs 43a–43f and makes the FIAP circuit 10 very quick, efficient, and less prone to error.

The signals FOUND_P0, FOUND_P1, FOUND_P2, and FOUND_P3 are active high and indicate, in combination with the LOST signal, to the local launch logic element 32 in the corresponding slot 21 whether or not and which port 22 is allocated to the slot 21 during a launch cycle. When the nodes NO0 . . . NO3 and LOST are driven to a high voltage to initialize the FIAP circuit 10', the signals FOUND_P0, FOUND_P1, FOUND_P2, and FOUND_P3 are driven to a low voltage (logic low) to indicate that no port has been allocated, as yet, by the FIAP circuit 10' to the associated slot 21 during this launch cycle.

In this first embodiment, the launch logic element 32 (FIG. 2) produces and provides a GET1 signal (active high) and a GET0 signal (active high) to the FIAP circuit 10'. The GET0 signal is provided to and actuate a series of n-channel metal-oxide-semiconductor field-effect transistors (NMOSFETs) 54a–54d, which are connected between respective input nodes NI0 . . . NI3 and respective output nodes NO0 . . . NO3. The GET1 signal is provided to and actuate a series of NMOSFETs 56a–56d, which are connected between input nodes NI0 . . . NI3 and output nodes NO1 . . . NO3, LOST, respectively. Essentially, when the GET0 signal is deasserted and the GET1 signal is asserted, then the FIAP circuit 10' will attempt to have a port 22 allocated to the associated slot 21. The FIAP circuit 10' will not attempt to have a port 22 allocated to the associated slot 21 if the GET0 signal is asserted. Either GET0 or GET1 is asserted for correct operation.

The LOST output node is driven to high voltage when all ports 22 have been allocated to indicate to any remaining slots 21 (and respective instructions) that no more ports 22 remain during the pertinent launch cycle. This is accomplished when NMOSFET 56d is actuated. When the input NI3 is at low voltage (active low; corresponds to a logic high; all 3 ports have been allocated) and GET1 is asserted, then the input to inverter 45 is driven to low voltage, and its output to high voltage. This causes actuation of NMOSFET 47, which pulls the input to inverter 52 to low voltage (from high voltage, where it was initialized) and its output to high voltage (active high; indicates LOST to remaining slots 21). The LOST signal is communicated from each FIAP circuit 10' to the next FIAP circuit 10' by way of an NMOSFET 49. The NMOSFET 49 is connected between the inverter 52 and ground and is actuated in a particular FIAP circuit 10' by the LOST signal that is input by the previous FIAP circuit 10'.

In the preferred embodiments, as previously mentioned, a START signal is asserted to one of the FIAP circuit 10' by the arbitration logic mechanism 36 during each launch cycle. Only one START signal is asserted in the queue 18 during each launch cycle. This initiates the propagation of the set 34 of signals through the slots 21. In the preferred embodiment, the arbitration logic mechanism 36 attempts to launch the older instructions before newer instructions in the queue 21 on a first-in-first-out (FIFO) basis, whenever possible, but of course, based upon the clearance of operand dependencies. Accordingly, the START signal is asserted to the slot 21 having the oldest or approximately the oldest instruction in the queue 18. As shown in FIG. 3A, the START signal actuates NMOSFET 58, which connects NMOSFET 54a to ground, as shown. The START signal effectively enables (or disables) the slot 21 to launch execution at the appropriate time.

In a possible alternative embodiment, the queue 18 may be designed to limit the number if FIAP circuits 10,10',10" through which to ripple the entire set 34 of signals during each launch cycle. To accomplish this, an NMOSFET 51 is connected between the input to inverter 52 and ground and is actuated by a STOP signal that is asserted and deasserted by the arbitration logic mechanism 36. Furthermore, the oldest slot 21 is asserted the START signal to commence the propagation cycle and a STOP signal is asserted to the slot 21 where the propagation is to stop. The number of slots 21 that will experience the propagation ripple can be predefined or dynamically determined and can be based upon performance or other considerations. The LOST signal (active high) will be forced to a high voltage when propagation reaches the last slot 21, having the asserted STOP, or earlier if all ports 22 have been allocated, and then the asserted LOST signal will ripple back around to (but not past) the oldest slot 21 having the asserted START signal. The propagation of the LOST signal takes much less time than the other signals of the set 34, and accordingly, the foregoing configuration shortens the entire instruction selection and port allocation process.

Figure 4:
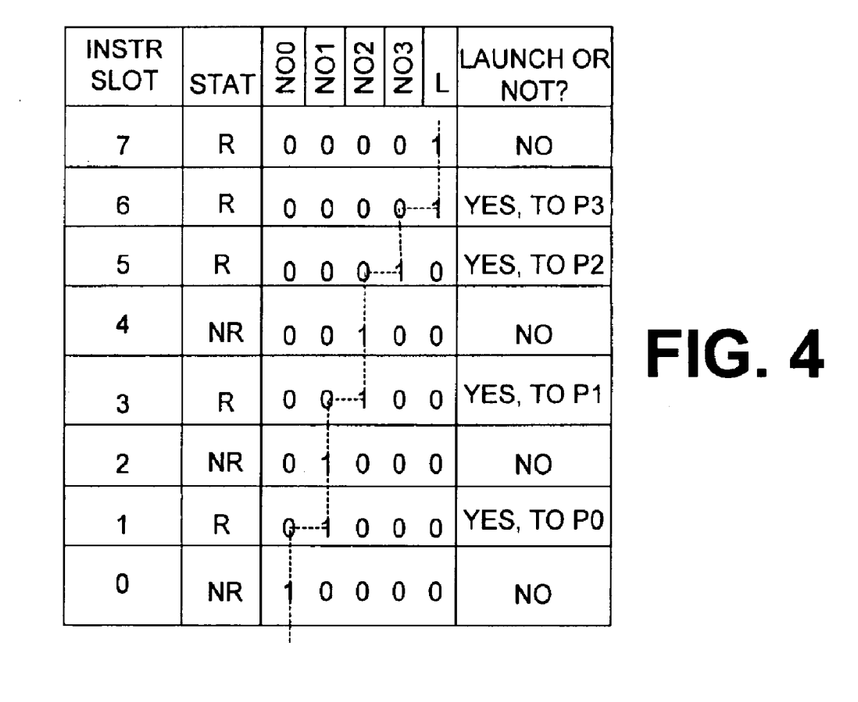
FIG. 4 is a table showing an example of operation of the first embodiment of the FIAP circuit of FIG. 3A.

FIG. 4 shows a table for illustrating propagation of the set 34 of signals, N1 . . . N3 and LOST, through the succession of FIAP circuits 10' (FIG. 3A). The status of a slot 21, i.e., whether the slot 21 is ready (R) or not ready (NR) to access a port 22, is defined by the GET0 and GET1 signals (FIG. 3A). In this example, as reflected in FIG. 4, it will be assumed that the queue 21 (FIGS. 1 and 2) includes at least seven instruction slots and that four ports P0 . . . P3 are available to be allocated during this launch cycle. Furthermore, assume in this example that the readiness (R or NR) of the slots 0–7 are as shown in FIG. 4. Finally, note that the table of FIG. 4 shows logic states, as opposed to voltages, at particular output nodes, and accordingly, with respect to the output nodes (active low), a "1" and a "0" correspond to a logic low and a logic high, respectively, and with respect to the LOST node (active high), a "1" and a "0" correspond to a logic high and a logic low, respectively.

At instruction slot 0, which is not ready (NR), the slot 0 receives NI0, NI1, NI2, NI3, LOST as 1,0,0,0,0, respectively. To ensure clarity in understanding the FIAP circuit 10', the foregoing set of logic states corresponds to the following respective voltages in the FIAP circuit 10' at the respective nodes: low, high, high, high, low. This set of bits, in effect, indicates that no ports have been allocated yet during this launch cycle and that 4 ports are available. Because in this example, slot 0 is not ready for execution, its corresponding GET0 signal will be asserted, in which case the outputs will exhibit the signal states of the inputs, or more specifically, NO0, NO1, NO2, NO3, LOST will exhibit the following set of logic states, respectively: 1,0,0,0,0. Note that the dotted/dashed line passing through the table of FIG. 4 essentially illustrates the propagation, or ripple, of a logic high ("1") through the FIAP circuits 10' from the slot 21 that receives the START signal to and through the other remaining slots 21.

Next, instruction slot 1, which is ready to launch into execution, receives NI0, NI1, NI2, NI3, LOST as 1,0,0,0,0, respectively. In this slot 1, the GET1 signals are asserted (because it is ready), and accordingly, NO0 will transition from a logic high to a logic low (transition from low voltage to high voltage) and NO1 will monotonically transition from a logic low to a logic high (transition from high voltage to low voltage), as shown in FIG. 4. Moreover, the FOUND_P0 signal will monotonically transition from logic low to a logic high to indicate to the local logic element 32 of slot 1 that the local instruction has been allocated port P0 to access. As a result of the foregoing, the outputs NO0, NO1, NO2, NO3, LOST will exhibit the following set of logic states, respectively: 0,1,0,0,0.

Because the instruction the register 15 (FIG. 1) associated with slot 2 is not ready, FIAP circuit 10' of slot 2 receives and transmits on to the next slot, or slot 3, the set 0,1,0,0,0.

At instruction slot 3, however, which is ready for execution, NO1 monotonically transitions from a logic high (low voltage) to a logic low (high voltage), which causes the FOUND_P1 signal to monotonically transition from a logic low (low voltage) to a logic high (high voltage) to indicate to the local launch logic 32 that the local instruction in register 15 (FIG. 1) has been allocated and can now use port P1. Additionally, NO2 transitions from a logic low to a logic high. Thus, the FIAP circuit 10' associated with slot 3 outputs the bit set 0,0,1,0,0.

Instruction slot 4 receives the bit set 0,0,1,0,0 from slot 3. This bit set indicates to slot 4 that ports P1 and P0 have already been allocated to other slots during this launch cycle and than ports P2 and P3 remain to be allocated. Because the instruction associated with instruction slot 4 is not ready for execution, the foregoing set is passed on unchanged to instruction slot 5.

At instruction slot 5, which receives 0,0,1,0,0, the output node NO2 transitions from logic high to logic low, which causes the FOUND_P2 signal to transition from a logic low to a logic high to indicate to the local launch element 32 that the local instruction can have access to port P2. Additionally, NO3 transitions from a logic low to a logic high. The FIAP circuit 10' of slot 5 outputs 0,0,0,1,0, as a result of the aforementioned ripple operation.

Instruction slot 6 receives the bit set 0,0,0,1,0. Moreover, output node NO3 transitions from a logic high to a logic low, which causes the FOUND_P3 signal to monotonically transition from a logic low to a logic high. This indicates to the local launch element 32 that the local instruction has been allocated and can have access to port P3. In addition, the LOST signal transitions from a logic low to a logic high at this slot 6. The LOST signal is propagated to the remainder of the slots 21 so as to advise the remainder of the slots that the remaining instructions cannot be launched during this launch cycle, even if they are ready, because no more ports 22 remain to be allocated.

Thus, as shown in FIG. 4, at instruction slot 7, which is ready to execute, the instruction in slot 7 is prevented from executing, as there are no more ports 22 available during this launch cycle. Any and all slots beyond slot 7 will also be prevented from launching, whether they are ready or not, based upon the asserted LOST signal that they will all receive.

FIG. 3B is a second embodiment of the FIAP circuit 10 and is generally denoted by reference numeral 10". Much of the architecture of the second embodiment is the same as the first embodiment, and the operation of the circuitry in FIG. 3B is evident based upon the foregoing description relative to the first embodiment in FIG. 3A. Like reference numerals among the figures designate corresponding parts. Accordingly, only the significant differences between the two embodiments are specifically described here.

The FIAP circuit 10" enables a signal instruction to allocate one or a plurality of ports 22, in this example, one or two ports 22, during a signal launch cycle. This is accomplished, in part, by having the local launch logic element 32 produce, in addition to the GET0 and GET1 signals, a GET2 signal (also active high), which enables the local instruction to access one or two ports 22 during each launch cycle. The GET2 signal is communicated to and is used to actuate NMOSFETs 57a–57d, which are connected as shown in FIG. 3B. When asserted, the GET2 signal enables a logic high to ripple across two output nodes, which causes assertion of two adjacent FOUND signals. When the GET2 signal is deasserted and the GET1 signal is asserted, then the FIAP circuit 10" will attempt to have one of the ports 22 allocated to its corresponding slot 21 and instruction. When neither the GET1 nor the GET2 signal is asserted, then the GET0 signal should be asserted, and the slot 21 is basically not ready to access a port.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims. As examples of the foregoing, the following should be noted: the queue 18 can have any number of slots 21; the queue 18 can be replaced with some other instruction reordering mechanism or means, for example but not limited to, a reservation station, which is well known in the art; the FIAP circuit 10 can be configured to propagate any number of N signals through the various slots 21 of the queue 18; and each FIAP circuit 10 can be configured to allocate any desired number of ports 22 to each instruction.

Now, therefore, at least the following is claimed:

1. A method for finding a predefined plurality of instructions, if available, that are ready to be executed and that reside in an instruction reordering mechanism of a processor that can launch execution of instructions out of order via a predefined number of instruction ports, comprising the steps of:
   (a) providing said instruction reordering mechanism having a plurality of said instructions, each said instruction having a respective logic element for causing and preventing launching, when appropriate, of said instruction; and
   (b) propagating a set of signals successively through said logic elements of said instruction reordering mechanism, said set of signals responsive to instruction ports and port information, wherein an instruction identified as valid for launching is launched on a select instruction port selected from a plurality of instruction ports available to process the instruction, the select instruction port identified via propagation logic forwarded through said logic elements and wherein said propagation logic includes a next available instruction port identifier when an instruction port is available and an indication of how many instruction ports are available.

2. The method of claim 1, further comprising the step of:
   advising each instruction port of said instruction reordering mechanism during each launch cycle either that said instruction will be launched or that said instruction will not be launched.

3. The method of claim 1, wherein said signals are propagated through said logic elements only in response to logic transitions from a first logic level to a second logic level.

4. The method of claim 1, further comprising the step of:
   communicating said predefined plurality of said instructions to a corresponding predefined plurality of instruction ports associated with one or more execution resources.

5. The method of claim 1, further comprising the step of, after said predefined plurality of said instructions have been selected, propagating a lost signal to remaining logic elements associated with remaining instructions of said instruction reordering mechanism to indicate to said remaining logic elements that their respective remaining instructions have not been selected.

6. The method of claim 1, further comprising the steps of:
(c) after said predefined plurality of said instructions have been selected, propagating a lost signal to remaining logic elements associated with remaining instructions of said instruction reordering mechanism to indicate to said remaining logic elements that their respective remaining instructions have not been selected;
(d) performing steps (b) and (c) during a single cycle associated with one or more execution resources; and
(e) communicating said predefined plurality of said instructions from said instruction reordering mechanism to a corresponding predefined plurality of instruction ports associated with said one or more execution resources.

7. The method of claim 1, further comprising the step of:
(c) providing said instruction reordering mechanism in a form of a queue having a plurality of slots, each said slot having a respective one of said logic elements and means for temporarily storing a respective instruction; and
(d) propagating said set of said signals successively through said slots of said queue during an execution cycle.

8. The method of claim 1, wherein said set comprises two or more signals.

9. The method of claim 1, further comprising the step of:
(c) causing said propagation through only a predefined number of said logic elements during a launch cycle.

10. A method for quickly finding a predefined plurality of instructions, if available, that are ready to be executed and that reside in a queue of a processor that can launch the execution of instructions out of order, so that the found instructions can be communicated to a corresponding predefined plurality of ports associated with one or more execution resources, comprising the steps of:
(a) providing said queue having a plurality of slots, each said slot for temporarily storing a respective instruction and launching, when appropriate, execution of said respective instruction; and
(b) propagating a set of signals successively through slots of said queue during a launch cycle, said set of signals responsive to available instruction ports and port information to launch execution of an instruction that, when passed through a particular slot:
(1) select said particular slot for launching when said particular slot is ready by asserting in said slot one or more found signals that identify one or more specific ports associated with said one or more execution resources;
(2) refrain from selecting said particular slot when said particular slot is not ready by asserting in said slot a lost signal;
(3) track slots that have been selected during said launch cycle; and
(4) direct the selection of no more than said predefined plurality of said instructions during said launch cycle,
wherein an instruction identified as ready for launching is launched on a select instruction port identified via said set of signals forwarded through said queue, said set of signals comprising a next available instruction port identifier when an instruction port is available and an indication of how many instruction ports are available.

11. The method of claim 10, further comprising the step of:
communicating said predefined plurality of said instructions from said queue to said corresponding predefined plurality of ports associated with said one or more execution resources.

12. The method of claim 10, further comprising the step of:
(c) during said launch cycle but after said predefined plurality of said instructions have been selected, propagating a lost signal to remaining slots associated with remaining instructions of said queue to indicate to said remaining slots that their respective remaining instructions have not been selected.

13. A system for finding a predefined plurality of instructions, if available, that are ready to be executed in a processor that can launch execution of instructions out of order, comprising:
(a) an instruction reordering mechanism for temporarily storing a plurality of said instructions; and
(b) a plurality of logic elements associated with said instruction reordering mechanism and associated respectively with each of said instructions in said instruction reordering mechanism for causing and preventing launching, when appropriate, of respective instructions, said logic elements configured to propagate a plurality of signals through said logic elements, said plurality of signals responsive to available instruction ports selected from a plurality of instruction ports available to process the instruction port and port information to launch execution of an instruction identified as valid for launching such that an instruction is launched on an instruction port identified via propagation logic forwarded through said logic elements said propagation logic comprising a next available instruction port identifier when an instruction port is available and an indication of how many instruction ports are available.

14. The system of claim 13, wherein each of said logic elements is configured to receive said set of signals from a previous logic element, to evaluate said set of signals to determine whether or not to launch a respective instruction, to modify states associated with said set of signals based upon whether or not said respective instruction was launched, and to propagate said set of said signals to a later logic element.

15. The system of claim 13, wherein each one of said logic elements is implemented in combinational logic hardware.

16. The system of claim 13, wherein each said logic element is configured to, after said predefined plurality of said instructions have been selected, propagate a lost signal to remaining logic elements associated with said remaining instructions of said instruction reordering mechanism to indicate to said remaining logic elements that their respective remaining instructions have not been selected.

17. The system of claim 13, further comprising one or more execution resources having one or more ports to receive data from said predefined plurality of said instructions.

18. The system of claim 17, wherein at least one of said execution resources is an arithmetic logic unit (ALU).

19. The system of claim 17, wherein at least one of said execution resources is a multiple accumulate unit (MAC).

20. The system of claim 17, wherein at least one of said execution resources is a cache.

21. The system of claim 13, wherein said instruction reordering mechanism is a queue.

22. The system of claim 13, further comprising:
an arbitration mechanism configured to assert a start signal to one of said logic elements to initiate said propagation of said set of signals.

23. A system for finding a predefined plurality of instructions, if available, that are ready to be executed and that reside in a queue of a processor that can launch execution of instructions out of order, comprising:

(a) queue means for storing a plurality of said instructions, said queue means having a plurality of launch logic means for causing and preventing launching, when appropriate, of a respective instruction; and (b) logic means associated with said queue, said logic means for propagating a set of signals to successive launch logic means, said set of signals responsive to available instruction ports selected from a plurality of instruction ports and port information to launch execution of an instruction to indicate both when and which of one or more ports of one or more execution resources are available for each said instruction and when none of said ports are available, wherein an instruction identified as valid for launching by said launch logic means is launched on an instruction port identified via said set of signals forwarded through said launch logic means and wherein said set of signals includes a next available instruction port identifier when an instruction port is available and an indication of how many instruction ports are available.

* * * * *